Nov. 19, 1940. R. G. FERRIS 2,221,934
PIPE CONNECTION
Original Filed March 29, 1938 2 Sheets-Sheet 1
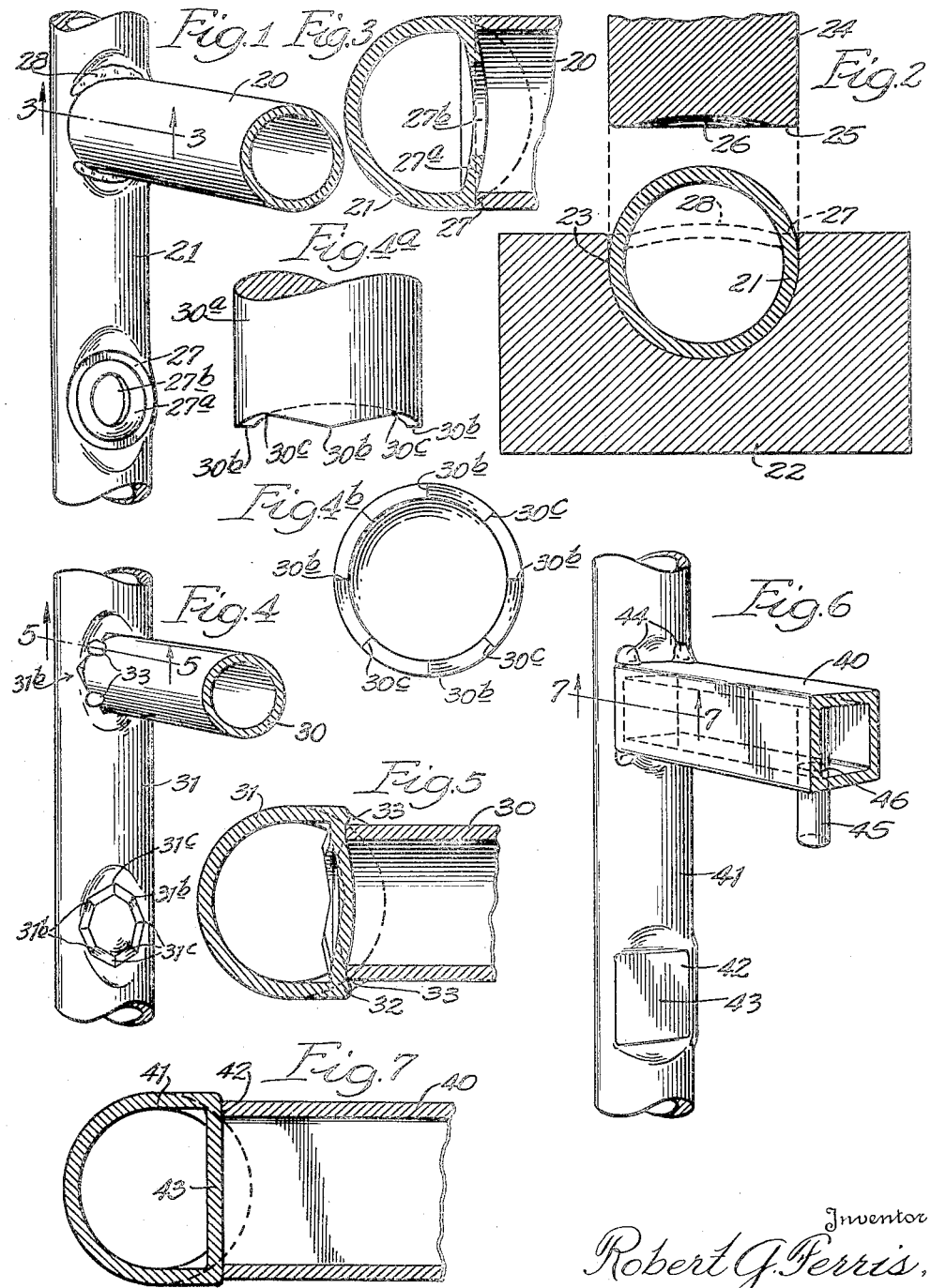
Inventor
Robert G. Ferris,
By Banning & Banning
Attorneys.

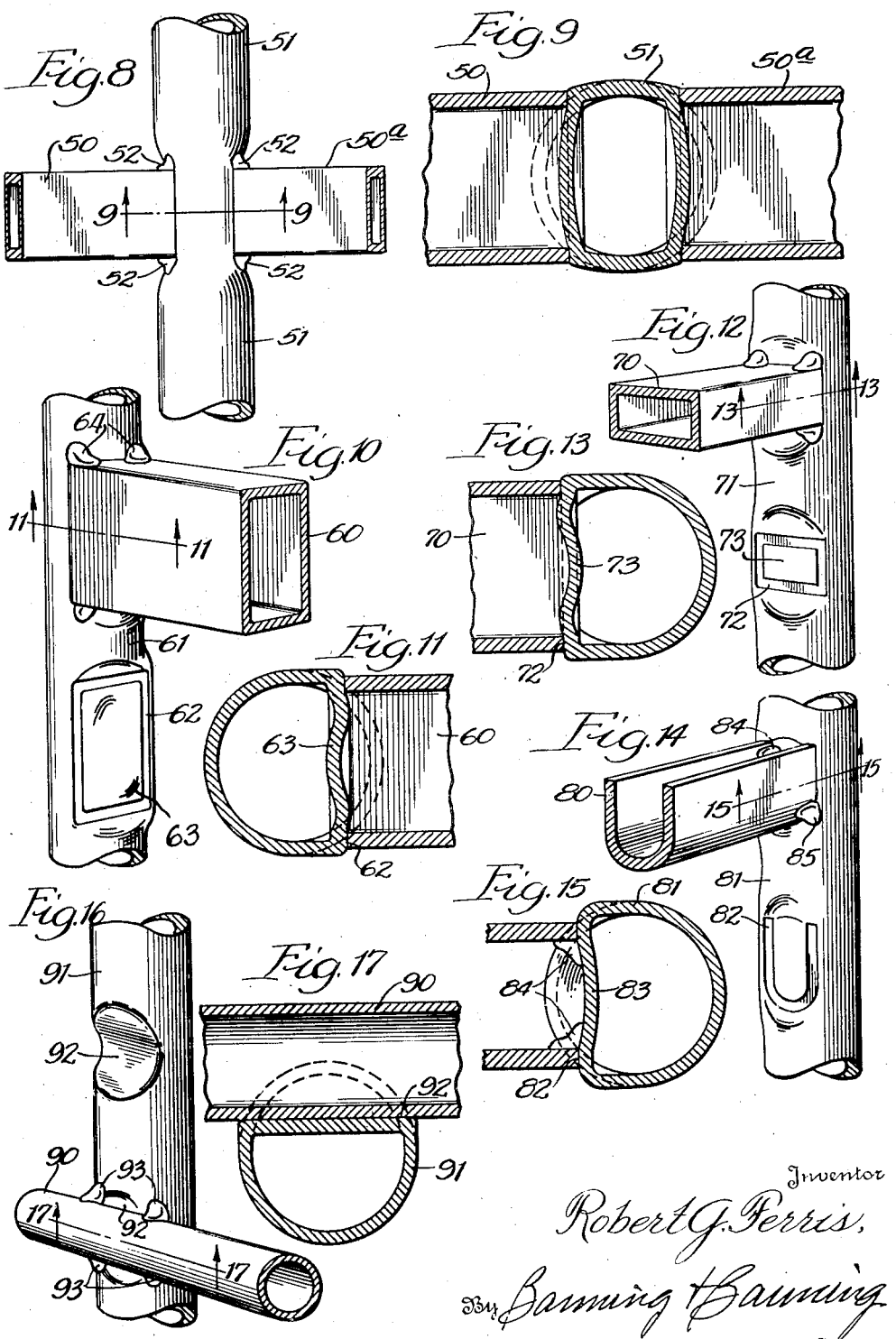

Patented Nov. 19, 1940

2,221,934

UNITED STATES PATENT OFFICE 2,221,934

PIPE CONNECTION

Robert G. Ferris, Harvard, Ill., assignor to Starline, Inc., Harvard, Ill., a corporation of Illinois Original application March 29, 1938, Serial No. 198,729, now Patent No. 2,192,904, dated March 12, 1940. Divided and this application April 13, 1939, Serial No. 267,650

6 Claims. (Cl. 287—54)

An object of this invention is to provide a simple and satisfactory welded connection between two iron pipes placed at right angles to each other.

This and other objects, as will hereinafter appear, are accomplished by this invention which is fully described in the following specification and shown in the accompanying drawings, in which—

Figure 1 is a partial perspective view of two pipes joined in accordance with my invention, both pipes being round and of equal diameter, the vertical pipe showing also the deformation for reception of the end of another horizontal pipe;

Fig. 2 is a partial enlarged view of a die and punch for deforming the pipe of Fig. 1;

Fig. 3 is a partial enlarged section on the line 3—3 of Fig. 1 showing the pipe deformed and showing the end of the second pipe assembled in position for welding;

Fig. 4 is a view similar to Fig. 1 wherein the first or horizontal pipe is of smaller diameter than the pipe to which it is yelded;

Figs. 4ᵃ and 4ᵇ are side and end views respectively of a modified form of punch for producing a series of projections for projection welding;

Fig. 5 is a partial enlarged section on the line 5—5 of Fig. 4;

Fig. 6 is a view similar to Fig. 1 showing a square pipe secured to the round pipe intermediate the ends of the latter;

Fig. 7 is a partial enlarged view on the line 7—7 of Fig. 6;

Fig. 8 is a partial front elevation of a round pipe having two square or rectangular pipes secured thereto at the two opposite sides of the vertical pipe and on the same level;

Fig. 9 is a partial enlarged section on the line 9—9 of Fig. 8;

Fig. 10 is a view similar to Fig. 6 but showing the second pipe rectangular instead of square, the long side of the rectangle being parallel with the axis of the vertical pipe to which it is secured;

Fig. 11 is a partial enlarged section on the line 11—11 of Fig. 10;

Fig. 12 is a view similar to Fig. 10 but showing a rectangular first pipe with the long side of the rectangle placed transversely to the axis of the second pipe to which it is secured;

Fig. 13 is a partial enlarged section on the line 13—13 of Fig. 12;

Fig. 14 is a view similar to Fig. 12 showing a U-shaped member secured to a vertical pipe intermediate its ends;

Fig. 15 is a partial enlarged view on the line 15—15 of Fig. 14;

Fig. 16 is a view similar to Fig. 14 showing a round pipe passing a vertical pipe and being partially embedded therein and welded thereto; and Fig. 17 is a partial enlarged view on the line 17—17 of Fig. 16.

This is a division of my application, Serial No. 198,729, filed March 29, 1938, for Pipe connections and method of making same, which has matured into Patent No. 2,192,904 granted March 12, 1940.

The embodiment illustrated in Fig. 1 comprises a pipe 20 secured to a pipe 21 intermediate the ends of the latter. For convenience, the pipe 20 is called a first or horizontal pipe and the pipe 21 a second or vertical pipe.

To prepare the second pipe 21 for reception of the end of the first pipe 20, the pipe 21 is placed in a die 22 which has a transverse groove 23 therein which has a semi-cylindrical bottom of a size to just enclose the lower portion of the pipe 21. Above this groove is located a punch 24 suitably operated and having a flat annular bottom 25 and a depressed central portion 26. The annular bottom 25 is of the same shape as the end of the pipe 20 but is slightly larger than said end so as to impress an annular deformation 27 in the pipe 21 adapted to form a uniform bearing for the end of the pipe 20.

The sides of the die 22 are made just high enough to be even with the bottom of the punch when at the bottom of its stroke as shown in dotted lines in Fig. 2 so that the metal of the pipe 21 is forced out against the sides of the die as there shown thereby preventing the pipe from spreading under the pressure of the punch. The portion 27ᵃ of the pipe enclosed within the deformation 27 is sprung outwardly as shown in Fig. 3. This portion will take different shapes according to the shapes and sizes of different punches as will later be seen.

With the pipe 20 held squarely in place on the deformation 27, the two pipes are firmly secured together by arc-welding as at 28, thereby forming a connection which is substantially as strong as the pipes themselves.

The pipe 21 may serve as a header for a series of parallel pipes 20. In that case the center of the deformation 27ᵃ may be drilled to form a hole 27ᵇ to provide communication between the header and pipes. In such a construction, the weld 28 completely encircles the pipe 20 thereby forming a gas-tight joint.

In Figs. 4 and 5 is shown a connection in which a horizontal pipe 30 is smaller than a vertical pipe 31 and the punch raises an annular ridge 32. The punch 30ª (see Figs. 4ª and 4ᵇ) has at its end alternate projections 30ᵇ and depressions 30ᶜ which when pressed into the pipe 31 produce alternate projections 31ᶜ, preferably four in number, and depressions 31ᵇ. When the squared or transversely cut end of the pipe 30 is pressed into engagement with these projections and a heavy welding current of electricity passed therebetween (by welding apparatus not shown) the projections become fused into the end of the pipe forming four welds 33. This process is known as projection welding.

In Figs. 6 and 7 is shown a form of connection in which a square pipe 40 is secured at its end to a round pipe 41, the pipe 40 being nearly as large as the pipe 41 as viewed in cross section (Fig. 7). A deformation 42 is provided in the vertical pipe 41, the punch (not shown) for causing this deformation being square and slightly larger than the squared end of the pipe 40. It will be observed that the central portion 43 of this deformation is substantially flat whereas the central portion of the deformation of the pipe of Fig. 3 is bowed outwardly. In this connection the draftsman has reproduced the actual bulges which took place in the pipes following the several deformations and this applies to all of the figures of the drawings shown herein except Fig. 5.

The squared end of the pipe 40 is held firmly against the deformation in the pipe 41 and while so held, the two are welded together by means of electric welds 44, preferably four in number. This construction lends itself quite well to animal pens and the like, and for this purpose I have shown a vertical rod 45 extending through an opening 46 in the bottom of the pipe 40. A similar horizontal pipe (not shown) would be secured to the pipe 41 at a point beneath the pipe 40, but would have holes provided in its upper surface so as to accommodate the lower end of the several rods 45 of which only one is shown. These rods are assembled in the horizontal pipes previous to welding the latter to the vertical pipe.

In Figs. 8 and 9 is shown still another modification of the invention in which two horizontal pipes 50, 50ª are secured to a vertical pipe 51, the latter being deformed on its two opposite sides to receive these pipes which, as here shown, are square or rectangular in cross section. The pipes 50, 50ª are secured to the vertical pipe as by means of electric welds 52.

Figs. 10 and 11 show a rectangular horizontal pipe 60 secured to a round vertical pipe 61 which has previously been acted upon by a punch having substantially the size and shape of the end of the pipe 60 to form a deformation 62 with a central depression 63. The pipe 60 whose end is adapted to bear against that deformation is secured in place by a series of gas or arc welds 64 or the like.

Figs. 12 and 13 are similar to Figs. 10 and 11 except that in Figs. 10 and 11 the horizontal pipe 60 which is rectangular in form is placed with the long axis of the rectangle parallel to the axis of a pipe 61 whereas in Figs. 12 and 13, a horizontal pipe 70 is rectangular in form with the long axis of the rectangle placed transversely to the axis of a vertical pipe 71 to which it is secured. The vertical pipe is deformed by means of a punch as previously described at 72. It will be observed that within the deformation 72 is a central portion 73 which takes a peculiar reverse bend. A similar bend 63 is shown in Fig. 11.

In Figs. 14 and 15 a horizontal U-shaped section 80 is secured to a vertical pipe 81. Here again a deformation 82 is formed in the vertical pipe by means of a die and punch, not shown, but similar to those previously described. Here again the punch is substantially the shape of the squared end of the section 80 but is slightly larger in its periphery. In this case, it will be observed in Fig. 15 that the central portion 83 within the deformation 82 is pressed inwardly. After holding the section 80 in alignment with the deformation in the vertical pipe 81, it is secured thereto at 84 and 85 by suitable welds.

In Figs. 16 and 17 is shown still another modification of the invention in which a horizontal pipe 90 lies across a vertical pipe 91, the latter being provided with a deformation 92 which is formed by a punch having the shape of the pipe 90. The pipe 90 will thus accurately fit the bottom of the deformation 92 and the two pipes can be firmly secured by means of suitable welds 93 which are here shown as four in number.

In all instances the vertical pipe is held by a suitable die, not shown, while a punch acts on the pipe to produce the desired deformation. This is true also of the vertical pipe (Figs. 8 and 9) wherein punches act from two opposite sides on the pipe to produce two deformations therein simultaneously.

It will be observed that this method of joining a pipe to a horizontal member is capable of many more modifications owing to the fact that numerous other horizontal members of different shapes, not shown, may thus be secured intermediate the length of a pipe which is deformed by means of a punch having substantially the cross section of the horizontal member which it is desired to attach to this pipe. Communicating openings like 27ᵇ of Fig. 1 may be used in many of these connections so that fluids of various kinds may be permitted to pass from one to the other. Where the connection is to be watertight or gas-tight, a continuous weld may be employed between the two pipes so joined.

The projection welds of Figs. 4 and 5 may be applied to any of the other modifications shown by using suitable punches for forming the surface of the vertical pipe to form projections to which the horizontal pipes may be welded by the projection welding process.

While I have shown and described several modifications of my invention, it is to be understood that it is capable of many more forms. Changes, therefore, may be made in the construction and arrangement without departing from the spirit and scope of the invention as disclosed in the appended claims.

I claim:

1. In combination, a pipe having a side deformation to provide exteriorly thereof a relatively flat seat whose width is substantially that of the pipe, and a member having an undeformed squared end one dimension of which approximates the width of the pipe adapted, when fitted against the seat, to engage therewith at substantially every point thereupon, the undeformed squared end of the member being welded to the pipe adjacent the outer face of the seat thereon.

2. In combination, a pipe having a side deformation to provide exteriorly thereof a seat extending flatwise across the pipe for substantially its entire width, and a member having an undeformed contour adapted for fitting against the seat to engage therewith at substantially every point crosswise thereof, the member being welded to the pipe adjacent the outer face of the seat thereon.

3. In combination, a header, a plurality of pipes having squared, undeformed ends, the opposite walls of the pipes continuing in spaced relation through to such ends, the header having a plurality of side deformations, each providing a seat exteriorly thereof against which may be fitted an end of one of said pipes, and means for sealing the junction of each pipe to the header, each seat being formed with an opening therethrough for communication between the header and its associated pipe.

4. In combination, an iron pipe having an undeformed, squared end with opposite walls of the pipe in spaced relation, and a second pipe having a side deformation to provide a seat exteriorly thereof having a series of alternately raised and lowered portions, the squared end of the first pipe being welded to the raised portions on the seat of the second pipe.

5. In combination, an iron pipe having an undeformed, squared end with the pipe walls in spaced relation, and a second iron pipe having a side deformation to provide a seat exteriorly thereof having a series of raised portions, the squared end of the first pipe being electrically welded to the raised portions of the seat on the second pipe.

6. In combination, an iron pipe having a transversely cut undeformed end with the opposite walls adjacent thereto in spaced parallel relation, and a second pipe having a side deformation providing a seat in a plane which is depressed in relation to the longitudinally adjacent pipe surfaces and of a size and contour substantially the same as the undeformed end of the first named pipe and which has opposite shoulders whereby said undeformed pipe end may abut against and fit within the depressed seat of the pipe last named between the shoulders thereof to engage with said seat at points which are spaced from the seat center, and a welded connection joining the two pipes immovably in the relationship specified.

ROBERT G. FERRIS.